US007110231B1

(12) United States Patent
De La Ree et al.

(10) Patent No.: US 7,110,231 B1
(45) Date of Patent: Sep. 19, 2006

(54) ADAPTIVE PROTECTION SYSTEM FOR A POWER-DISTRIBUTION NETWORK

(75) Inventors: Jaime De La Ree, Blacksburg, VA (US); James D. Stoupis, Raleigh, NC (US); Jeffrey L. McElray, Wendell, NC (US); Carl J. LaPlace, Raleigh, NC (US); Kornel Scherrer, Cary, NC (US)

(73) Assignee: ABB Inc., Norwalk, CT (US)

( * ) Notice: Subject to any disclaimer, the term of this patent is extended or adjusted under 35 U.S.C. 154(b) by 425 days.

(21) Appl. No.: 10/232,627

(22) Filed: Aug. 30, 2002

(51) Int. Cl.
H02H 3/00 (2006.01)
H02H 7/00 (2006.01)

(52) U.S. Cl. .......................................... 361/71; 361/67

(58) Field of Classification Search .................. 361/68, 361/71, 75, 65, 67, 64, 66, 69
See application file for complete search history.

(56) References Cited

U.S. PATENT DOCUMENTS

| | | | |
|---|---|---|---|
| 4,345,291 A * | 8/1982 | Riebs | 361/68 |
| 4,477,809 A | 10/1984 | Bose | 340/825.54 |
| 4,845,594 A * | 7/1989 | Wilkerson | 361/71 |
| 5,224,011 A | 6/1993 | Yalla et al. | 361/93 |
| 5,303,112 A * | 4/1994 | Zulaski et al. | 361/67 |
| 5,568,399 A | 10/1996 | Sumic | 364/492 |
| 5,574,611 A | 11/1996 | Nishijima et al. | 361/64 |
| 5,629,825 A | 5/1997 | Wallis et al. | 361/64 |
| 5,784,237 A | 7/1998 | Velez | 361/62 |
| 5,793,750 A | 8/1998 | Schweitzer, III et al. | 370/242 |
| 5,808,902 A | 9/1998 | Levert et al. | 364/492 |
| 5,809,045 A * | 9/1998 | Adamiak et al. | 714/799 |
| 5,896,302 A | 4/1999 | Goodpaster | 364/528.27 |
| 5,903,594 A | 5/1999 | Saulnier et al. | 375/200 |
| 5,973,899 A | 10/1999 | Williams et al. | 361/72 |
| 6,005,759 A * | 12/1999 | Hart et al. | 361/66 |
| 6,008,971 A | 12/1999 | Duba et al. | 361/64 |
| 6,018,449 A * | 1/2000 | Nelson et al. | 361/66 |
| 6,160,690 A | 12/2000 | Matsumoto et al. | 361/62 |
| 6,259,972 B1 | 7/2001 | Sumic et al. | 700/286 |
| 6,285,917 B1 | 9/2001 | Sekiguchi et al. | 700/239 |
| 6,292,340 B1 | 9/2001 | O'Reagan et al. | 361/78 |
| 6,297,939 B1 | 10/2001 | Bilac et al. | 361/64 |
| 6,341,054 B1 | 1/2002 | Walder et al. | 361/66 |
| 6,347,027 B1 | 2/2002 | Nelson et al. | 361/64 |
| 6,405,104 B1 | 6/2002 | Dougherty | 700/292 |

(Continued)

FOREIGN PATENT DOCUMENTS

| | | |
|---|---|---|
| JP | 402241333 A | 9/1990 |
| JP | 405137250 A | 6/1993 |

OTHER PUBLICATIONS

Hart et al., Automated Solutions for Distribution Feeders, IEEE Computer Applications in Power, Oct. 2000.*

(Continued)

*Primary Examiner*—Brian Sircus
*Assistant Examiner*—Z Kitov
(74) *Attorney, Agent, or Firm*—Woodcock Washburn LLP; Paul R. Katterle

(57) ABSTRACT

A preferred embodiment of a system comprises a recloser electrically coupled to a voltage source of a power-distribution network and adapted to isolate a section of a distribution feeder of the power-distribution network from the voltage source in response to an overcurrent condition in the section of the distribution feeder. The system also comprises a sectionalizer electrically coupled to the section of the distribution feeder. The sectionalizer and the recloser are adapted to communicate via a data network and the recloser is responsive to control inputs sent to the recloser from the sectionalizer over the data network.

39 Claims, 11 Drawing Sheets

U.S. PATENT DOCUMENTS

| | | |
|---|---|---|
| 6,496,342 B1 * | 12/2002 | Horvath et al. ............... 361/65 |
| 6,816,757 B1 | 11/2004 | De La Ree et al. ........ 700/286 |
| 2002/0015271 A1 | 2/2002 | Meisinger, Sr. et al. ...... 361/84 |

OTHER PUBLICATIONS

De La Ree, J., "An Adaptive Protection Scheme For Power Distribution Systems," Sep. 23, 2002.

Hart, David G., et al., "Automated Solutions For Distribution Feeders," IEEE Computer Applications In Power, Oct. 2000.

McElray, J.L, et al., "Loop Control Schemes Increase Restoration," IEEE/PES 2001 Transmission and Distribution Conference and Exposition, Oct. 28-Nov. 2, 2001.

ETI Report No. EST-R-01147, "Advanced Feeder Automation: New DA Switch Communication Schemes," Aug. 13, 2001.

* cited by examiner

| Approx Time | Event | Event Count | Status | Response |
|---|---|---|---|---|
| 0 | | Recloser 16 = 1<br>1st sectionalizer 22 = 0<br>2nd sectionalizer 24 = 0 | Recloser 16 = C (closed)<br>1st sectionalizer 22 = C<br>2nd sectionalizer 24 = C<br>Third sectionalizer 26 = O (open) | |
| 0+ | Permanent fault in first section 23 | Recloser 16 =1<br>1st sectionalizer 22 = 0<br>2nd sectionalizer 24 = 0 | Recloser 16 = O<br>1st sectionalizer 22 = C<br>2nd sectionalizer 24 = C<br>Third sectionalizer 26 = O | Recloser 16 opens and momentarily clears the fault overcurrent. |
| 0.5 Sec | Permanent fault in first section 23 | Recloser 16 = 2<br>1st sectionalizer 22 = 0<br>2nd sectionalizer 24 = 0 | Recloser 16 = C<br>1st sectionalizer 22 = C<br>2nd sectionalizer 24 = C<br>Third sectionalizer 26 = O | Recloser 16 closes (1st shot). Event count of recloser 16 increases. 1st sectionalizer 22 & 2nd sectionalizer 24 do not sense overcurrent. Event count and status of 1st & 2nd sectionalizers remain unchanged. |
| | | Recloser 16 =2<br>1st sectionalizer 22 = 0<br>2nd sectionalizer 24 = 0 | Recloser 16 = O<br>1st sectionalizer 22 = C<br>2nd sectionalizer 24 = C<br>Third sectionalizer 26 = O | Recloser 16 senses overcurrent and opens, clearing the overcurrent momentarily. All event counts and statuses remain unchanged. |
| 15 Sec | Permanent fault in first section 23 | Recloser 16 = 3<br>1st sectionalizer 22 = 0<br>2nd sectionalizer 24 = 0 | Recloser 16 = C<br>1st sectionalizer 22 = C<br>2nd sectionalizer 24 = C<br>Third sectionalizer 26 = O | Recloser 16 closes (2nd shot). Event count increases in recloser 16. 1st sectionalizer 22 & 2nd sectionalizer 24 do not sense overcurrent. Event count and status of 1st & 2nd sectionalizers remain unchanged. |

FIG. 4A

| | | | |
|---|---|---|---|
| | Recloser 16 = 3<br>1st sectionalizer 22 = 0<br>2nd sectionalizer 24 = 0 | Recloser 16 = O<br>1st sectionalizer 22 = C<br>2nd sectionalizer 24 = C<br>Third Sectionalizer 26 = O | Recloser 16 senses overcurrent fault and opens clearing the overcurrent momentarily. All event counts and statuses remain unchanged. |
| | Recloser 16=3<br>1st sectionalizer 22 = 0<br>2nd sectionalizer 24 = 0 | Recloser 16 = O<br>1st sectionalizer 22 = C<br>2nd sectionalizer 24 = C<br>Third sectionalizer 26 = O | 2nd sectionalizer 24 reads event count of 1st sectionalizer 22 from network 42. 1st sectionalizer 22 event count = 0 and 2nd Sectionalizer 22- event count = 0, so fault is not between 1st & 2nd sectionalizers 22, 24. 1st & 2nd sectionalizers 22, 24 do not take any action. |
| | Recloser 16 = 3<br>1st sectionalizer 22 = 0<br>2nd sectionalizer 24 = 0 | Recloser 16 = O<br>1st sectionalizer 22 = C<br>2nd sectionalizer 24 = C<br>Third sectionalizer 26 = O | 1st Sectionalizer 22 reads recloser 16 event count from network 42. Recloser 16 event count =3 and 1st Sectionalizer 24 event count = 0; fault is therefore between recloser 16 and 1st sectionalizer 22. |
| | Recloser 16 = 3<br>1st sectionalizer 22 = 0<br>2nd sectionalizer 24 = 0 | Recloser 16 = locked out<br>1st sectionalizer 22 = O<br>2nd sectionalizer 24 = C<br>Third sectionalizer 26 = O | 1st Sectionalizer 22 opens itself and sends a lockout command to Recloser 16. |
| | Recloser 16=3<br>1st sectionalizer 22 = 0<br>2nd sectionalizer 24 = 0 | Recloser 16 = locked out<br>1st sectionalizer 22= O<br>2nd sectionalizer 24 = C<br>Third Sectionalizer 26 = O | Third Sectionalizer 26 reads Recloser 16 event count & status and 1st Sectionalizer 22 event count and status from network 42. Third Sectionalizer 26 sends "change settings" command to 2nd Sectionalizer 24 in response. |

FIG. 4B

| | | Recloser 16 = 3<br>1st sectionalizer 22 = 0<br>2nd sectionalizer 24 = 0 | Recloser 16 = locked out<br>1st sectionalizer 22 = O<br>2nd Sectionalizer 24 = C w/ reversed polarity<br>Third sectionalizer 26 = O | 2nd Sectionalizer 24 reverses polarity. |
|---|---|---|---|---|
| | | Recloser 16 = 3<br>1st sectionalizer 22 = 0<br>2nd sectionalizer 24 = 0 | Recloser 16 = O/L<br>1st sectionalizer 22 = O<br>2nd sectionalizer 24 = C w/ reversed polarity<br>Third sectionalizer 26 = C | Third sectionalizer 26 reads status of 2nd sectionalizer 24 from network 42, confirms that 2nd sectionalizer 24 has reversed polarity; third sectionalizer 26 closes itself in response. |
| 25 Sec | Permanent fault in first section 23 | Recloser 16 = 3<br>1st sectionalizer 22 = 0<br>2nd sectionalizer 24 = 0 | Recloser 16 = locked-out<br>1st sectionalizer 22 = O<br>2nd sectionalizer 24 = C w/ reversed polarity<br>Third sectionalizer 26 = C | Un-faulted sections are energized by the second distribution feeder 53 |

FIG. 4C

| Approx Time | Event | Event Count | Status | Response |
|---|---|---|---|---|
| 0 | | Recloser 16 =1<br>1st sectionalizer 22 = 0<br>2nd sectionalizer 24 = 0 | Recloser 16 = C<br>1st sectionalizer 22 = C<br>2nd sectionalizer 24 = C<br>3rd sectionalizer 26 = O | |
| 0+ | Permanent fault in second section 25 | Recloser 16 =1<br>1st sectionalizer 22=0<br>2nd sectionalizer 24=0 | Recloser 16=O<br>1st sectionalizer 22=C<br>2nd sectionalizer 24=C<br>3rd Sectionalizer 26 = O | Recloser 16 opens and momentarily clears the fault overcurrent. |
| 0.5 Sec | Permanent fault in second section 25 | Recloser 16 =2<br>1st sectionalizer 22=1<br>2nd sectionalizer 24=0 | Recloser 16=C<br>1st sectionalizer 22=C<br>2nd sectionalizer 24=C<br>3rd sectionalizer 26 = O | Recloser 16 closes (first shot). Recloser 16 and 1st sectionalizer 22 sense fault overcurrent; event counts therein increase. 2nd sectionalizer 24 does not sense fault overcurrent; event count therein remains. |
| | | Recloser 16 = 2<br>1st sectionalizer 22 = 0<br>2nd sectionalizer 24 = 0 | Recloser 16 = O<br>1st sectionalizer 22 = C<br>2nd sectionalizer 24 = C<br>3rd sectionalizer 26 = O | Recloser 16 and opens and clears the overcurrent momentarily. All event counts and status remain unchanged |
| 15 Sec | Permanent fault in second section 25 | Recloser 16 = 3<br>1st sectionalizer 22 = 2<br>2nd sectionalizer 24 = 0 | Recloser 16 = C<br>1st sectionalizer 22 = C<br>2nd sectionalizer 24 = C<br>3rd sectionalizer 26 = O | Recloser 16 closes. (second shot). Recloser 16 and 1st sectionalizer 22 sense fault overcurrent; event counts therein increase. 2nd sectionalizer 24 does not sense fault overcurrent; event count therein does not change. |

FIG. 5A

| | | Recloser 16 = 3<br>1st sectionalizer 22 = 2<br>2nd sectionalizer 24 = 0 | Recloser 16 = O<br>1st sectionalizer 22 = C<br>2nd sectionalizer 24 = C<br>3rd sectionalizer 26 = O | Recloser 16 senses the fault overcurrent and opens, clearing the overcurrent momentarily. All event counts and statuses remain unchanged. |
|---|---|---|---|---|
| | | Recloser 16 = 3<br>1st sectionalizer 22 = 2<br>2nd sectionalizer 24 = 0 | Recloser 16 = O<br>1st sectionalizer 22 = C<br>2nd sectionalizer 24 = C<br>3rd sectionalizer 26 = O | 1st Sectionalizer 22 reads event count of recloser 16 from network 42. Since recloser 16 event count =3 and 1st sectionalizer 22 event count =2, the fault is not between recloser 16 and 1st sectionalizer 22. Recloser 16 and 1st sectionalizer 22 take no action. |
| | | Recloser 16 = 3<br>1st sectionalizer 22 = 2<br>2nd sectionalizer 24 = 0 | Recloser 16 = O<br>1st sectionalizer 22 = C<br>2nd sectionalizer 24 = C<br>3rd sectionalizer 26 = O | 2nd sectionalizer 24 reads 1st sectionalizer 22-event count from network 42. Since 1st sectionalizer 22 event count = 2 and 2nd sectionalizer 24 event count = 0, the fault is between the 1st & 2nd sectionalizers 22, 24. |
| | | Recloser 16 = 3<br>1st Sectionalizer 22 = 2<br>2nd Sectionalizer 24 = 0 | Recloser 16 = O<br>1st Sectionalizer 22 = O<br>2nd Sectionalizer 24 = O<br>3rd Sectionalizer 26 = O | 2nd Sectionalizer 24 masters the system reconfiguration. 2nd Sectionalizer 24 opens itself and sends an "open" command to 1st Sectionalizer 22 |
| | | Recloser 16 = 3<br>1st sectionalizer 22 = 0<br>2nd sectionalizer 24 = 0 | Recloser 16 = C<br>1st sectionalizer 22 O<br>2nd sectionalizer 24 = O<br>3rd sectionalizer 26 = O | Recloser 16 reads 1st sectionalizer 22 event count and status, and 2nd sectionalizer 24 event count and status from network 42. Recloser 16 closes itself in response. |

FIG. 5B

|  |  | Recloser 16 = 3<br>1st sectionalizer 22<br>= 0<br>2nd sectionalizer 24<br>= 0 | Recloser 16 = C<br>1st sectionalizer 22<br>= O<br>2nd sectionalizer 24<br>= O<br>3rd sectionalizer 26<br>= O | 3rd sectionalizer 26 reads statuses of recloser 16 counter, 1st sectionalizer 22 counter, and 2nd sectionalizer 24 from network 42 3rd sectionalizer 26 closes itself in response. |
|---|---|---|---|---|
| 25 Sec |  | Recloser 16 = 3<br>1st sectionalizer 22<br>= 0<br>2nd sectionalizer 24<br>= 0 | Recloser 16 = C<br>1st sectionalizer 22<br>= O<br>2nd sectionalizer 24<br>= O<br>3rd sectionalizer 26<br>= C | Un-faulted sections are fed by second distribution feeder 53 |

FIG. 5C

| Approx Time | Event | Event Count | Status | Response |
|---|---|---|---|---|
| 0 | | Recloser 16 =1<br>1st sectionalizer 22 = 0<br>2nd sectionalizer 24 = 0 | Recloser 16 = C<br>1st sectionalizer 22 = C<br>2nd sectionalizer 24 = C<br>3rd sectionalizer 26 = O | |
| 0+ | Permanent fault in third section 27 | Recloser 16 = 1<br>1st sectionalizer 22 = 0<br>2nd sectionalizer 24 = 0 | Recloser 16 = O<br>1st sectionalizer 22 = C<br>2nd sectionalizer 24 = C<br>3rd sectionalizer 26 = O | Recloser 16 opens and momentarily clears the fault overcurrent |
| 0.5 Sec | Permanent fault in third section 27 | Recloser 16 = 2<br>1st sectionalizer 22 = 1<br>2nd sectionalizer 24 = 1 | Recloser 16 = C<br>1st sectionalizer 22 = C<br>2nd sectionalizer 24 = C<br>3rd sectionalizer 26 = O | Recloser 16 closes (first shot). Recloser 16, 2nd sectionalizer 24 and 1st sectionalizer 22 all sense the fault overcurrent; all event counts increase. |
| | | Recloser 16 = 2<br>1st sectionalizer 22 = 1<br>2nd sectionalizer 24 = 1 | Recloser 16 = O<br>1st sectionalizer 22 = C<br>2nd sectionalizer 24 = C<br>3rd sectionalizer 26 = O | Recloser 16 senses the fault overcurrent and opens, clearing the over current momentarily. All event counts and statuses remain unchanged. |
| 15 Sec | Permanent fault in third section 27 | Recloser 16 = 3<br>1st sectionalizer 22 = 2<br>2nd sectionalizer 24 = 2 | Recloser 16 = C<br>1st sectionalizer 22 = C<br>2nd sectionalizer 24 = C<br>3rd sectionalizer 26 = O | Recloser 16 closes (second shot). Recloser 16, 2nd sectionalizer 24 and 1st sectionalizer 22 all sense the fault overcurrent; all event counts increase. |

FIG. 6A

|  |  | Recloser 16 = 3<br>1st sectionalizer 22 = 2<br>2nd sectionalizer 24 = 2 | Recloser 16 = 0<br>1st sectionalizer 22 = C<br>2nd sectionalizer 24 = C | Recloser 16 senses the fault overcurrent and opens clearing the fault current momentarily. All event counts and |
|  |  |  | 3rd sectionalizer 26 = 0 | statuses remain unchanged. |
|  |  | Recloser 16 = 3<br>1st sectionalizer 22 = 2<br>2nd sectionalizer 24 = 2 | Recloser 16=0<br>1st sectionalizer 22=C<br>2nd sectionalizer 24 = 0<br>3rd sectionalizer 26 = 0 | 2nd sectionalizer 24 opens itself by internal settings. |
|  |  | Recloser 16 = 3<br>1st sectionalizer 22 =<br>2nd sectionalizer 24 = 2 | Recloser 16 = C<br>1st sectionalizer 22 = C<br>2nd sectionalizer 24 = 0<br>3rd sectionalizer 26 = 0 | Recloser 16 reads event counts of 1st & 2nd sectionalizers 22, 24 and status of 2nd sectionalizer 24. Since 1st & 2nd sectionalizer 22 event counts =2 and 2nd sectionalizer 24 status is open, faults is between 2nd and 3rd sectionalizers 24, 26; recloser 16 closes itself in response. |
| 25 Sec |  | Recloser 16 = 3<br>1st sectionalizer 22 = 2<br>2nd sectionalizer 24 = 2 | Recloser 16 = C<br>1st sectionalizer 22 = C<br>2nd sectionalizer 24 = 0<br>3rd sectionalizer 26 = 0 |  |

FIG. 6B

ADAPTIVE PROTECTION SYSTEM FOR A POWER-DISTRIBUTION NETWORK

FIELD OF THE INVENTION

The present invention relates power-distribution networks. More particularly, the invention relates to a system that is adapted to identify and isolate faults in a power-distribution network.

BACKGROUND OF THE INVENTION

Power-distribution networks typically deliver electrical power to consumers using an interconnected arrangement of transmission lines, distribution buses, distribution feeders, etc. Power-distribution networks are typically configured so that electrical power can be delivered over more than one path within the network. Moreover, power-distribution networks are often configured so that power can be delivered from two or more alternative sources (although only one source can supply the network at a given instant). Configuring a power-distribution network in this manner reduces the potential for a single-point fault to leave large numbers of users without electrical power.

Power-distribution networks are commonly equipped with sectionalizers that permit a section of the network to be isolated from its neighboring sections on a selective basis. The feature permits a faulted section of the network, i.e., a section of the network having a fault therein, to be de-energized and isolated so that other sections of the network can be re-energized after the occurrence of the fault.

Power-distribution networks are also commonly equipped with reclosers. Reclosers are adapted to trip, or open, in response to an overcurrent condition, thereby interrupting the flow of electrical power and clearing the fault condition on at least a temporary basis. A typical recloser is also adapted to close after a predetermined interval to restore the flow of electrical power to the network. A reoccurrence of the fault upon closing will cause the recloser to once again trip. Transient-type faults can sometimes be cleared by repeated closings and openings of the recloser. Hence, the recloser may be closed several times following each trip until the fault clears, or until a predetermined number of closings have occurred. Reclosers can thus eliminate prolonged power outages and unnecessary service calls caused by a transient fault.

The reclosers and sectionalizers of a power-distribution network can be connected to a centralized communication unit that facilitates communication between the reclosers and sectionalizers. This feature permits the reclosers and sectionalizers to share operational information, via the communication unit, such as open-closed status, load condition, etc. The reclosers and sectionalizers can thus be adapted to operate in a coordinated manner, i.e., each recloser and sectionalizer can be adapted to open or close itself based on the operational status of the other reclosers or sectionalizers. Coordinating the operation of the reclosers and sectionalizers in this manner permits faulted sections of the power distribution network to be isolated, and allows power to be restored to sections in which a fault is not present (provided an alternative power source is available).

Power-distribution networks that are not equipped with a centralized communication unit often rely on repeated closings and openings of a recloser to identify and isolate a faulted section. For example, the sectionalizers downstream of the recloser, i.e., the sectionalizers separated from the voltage source by the recloser, may be opened on a sequential basis after the recloser has cycled through a predetermined number of closings and openings. More particularly, the sectionalizer located farthest from the recloser in the network may be adapted to open after the recloser has closed and reopened a predetermined number of times, e.g., two (this can be accomplished by programming the sectionalizer to open after a predetermined amount of time has elapsed following a drop in the voltage or current in the sectionalizer).

The sectionalizer located immediately upstream of the open sectionalizer may be adapted to open after the next closing and reopening the recloser. This process occurs for each subsequent upstream sectionalizer until the recloser remains closed, i.e., until the faulted section is no longer energized upon the closing of the recloser. This approach is time consuming in comparison to the use of a centralized communication unit to facilitate coordinated operation among the reclosers and sectionalizers. Moreover, power cannot be restored to un-faulted sections located downstream of the faulted section, i.e., to un-faulted sections separated from the voltage source by the faulted section, using this approach.

A centralized communication unit, however, represents an additional component in the power-distribution network, and thus adds to the overall cost, complexity, and maintenance requirements of the network. Moreover, the lines through which communications are exchanged between the centralized communication unit and the other components of the power-distribution network add further to the overall cost, complexity, and maintenance requirements of the network. Also, the centralized communication unit and its associated communication lines represent potential points of failure that can adversely affect the operation of the power-distribution network.

SUMMARY OF THE INVENTION

A preferred embodiment of an adaptive protection system for a power-distribution network comprises a recloser electrically coupled to a first voltage source and a first section of a distribution feeder and adapted to isolate the first section from the first voltage source in response to an overcurrent condition in the distribution feeder, and a first sectionalizer electrically coupled to the first section and a second section of the distribution feeder. The first sectionalizer is adapted to isolate the first section from the second section on a selective basis.

The adaptive protection system also comprises a second sectionalizer electrically coupled to the second section and a third section of the distribution feeder and adapted to isolate the second section from the third section on a selective basis. The recloser and the first and second sectionalizers are adapted to communicate directly by way of a data network, and the recloser is responsive to control inputs from at least one of the first and second sectionalizers. At least one of the first and second sectionalizers is responsive to control inputs from the other of the first and second sectionalizers.

A preferred embodiment of a system comprises a recloser electrically coupled to a voltage source of a power-distribution network and adapted to isolate a section of a distribution feeder of the power-distribution network from the voltage source in response to an overcurrent condition in the section of the distribution feeder. The system also comprises a sectionalizer electrically coupled to the section of the distribution feeder. The sectionalizer and the recloser are adapted to communicate via a data network using a TCP/IP protocol and the recloser is responsive to control inputs sent to the recloser from the sectionalizer over the data network.

Another preferred embodiment of a system comprises a recloser electrically coupled to a first voltage source and comprising a microprocessor-based controller and a gateway equipped with a TCP/IP communications protocol, and a first sectionalizer electrically coupled to the recloser so that the recloser is adapted to isolate the first sectionalizer from the first voltage source on a selective basis. The first sectionalizer comprises a microprocessor-based controller and a gateway equipped with the TCP/IP communications protocol.

The system also comprises a second sectionalizer electrically coupled to the first sectionalizer so that the first sectionalizer is adapted to isolate the second sectionalizer from the first voltage source on a selective basis. The second sectionalizer comprises a microprocessor-based controller and a gateway equipped with the TCP/IP communications protocol.

The system also comprises a third sectionalizer electrically coupled to the second sectionalizer so that the third sectionalizer is adapted to isolate the second sectionalizer from a second voltage source on a selective basis. The third sectionalizer comprises a microprocessor-based controller and a gateway equipped with the TCP/IP communications protocol. The controller and the gateway of each of the recloser and the first, second, and third sectionalizers are adapted to one or more of sense an overcurrent condition caused by a fault in a section of a distribution feeder, identify the section of the distribution feeder having the fault, generate one or more control inputs based on the location of the section of the distribution feeder having the fault, and send and receive the control inputs to and from the other ones of the recloser and the first and second sectionalizers by way of a data network to isolate the section of the distribution feeder having the fault.

A preferred embodiment of a power-distribution network comprises a first voltage source and a distribution feeder. The distribution feeder comprises an electrically-conductive cable. The distribution feeder also comprises a recloser electrically coupled to the first voltage source and a first section of the cable and adapted to isolate the first section from the first voltage source in response to an overcurrent condition in the distribution feeder, and a first sectionalizer electrically coupled to the first section and a second section of the cable. The first sectionalizer is adapted to isolate the first section from the second section on a selective basis.

The distribution feeder also compris a second sectionalizer electrically coupled to the second section and a third section of the cable and adapted to isolate the second section from the third section on a selective basis. The recloser and the first and second sectionalizers are adapted to communicate directly by way of a data network, and the recloser is responsive to control inputs from at least one of the first and second sectionalizers. At least one of the first and second sectionalizers is responsive to control inputs from the other of the first and second sectionalizers.

Another preferred embodiment of a system comprises a recloser electrically coupled to a first voltage source and a first section of a distribution feeder. The recloser comprises a controller and an interrupting mechanism adapted to move between an open and a closed position in response to a control input from the controller. The system also comprises a first sectionalizer electrically coupled to the first section and a second section of the distribution feeder. The first sectionalizer comprises a controller and a switch adapted to move between an open and a closed position in response a control input from the controller.

The system further comprises a second sectionalizer electrically coupled to the second section and a third section of the distribution feeder. The second sectionalizer comprises a controller and a switch adapted to move between an open and a closed position in response to a control input from the controller. The system also comprises a peer-to-peer communication system comprising a plurality of gateways each electrically coupled to a respective one of the controllers and each being equipped with a common communications protocol so that the gateways are adapted to exchange information directly over a data network.

A preferred method for isolating a faulted section of a distribution feeder of a power-distribution network comprises identifying the location of the faulted section by comparing at least one of the number of times a recloser of the distribution feeder has responded to an overcurrent condition with a number of times at least one of a first and a second sectionalizer of the distribution feeder has sensed the overcurrent condition, and the number of times the first and second sectionalizers have each sensed the overcurrent condition. The method also comprises generating control inputs using at least one of the recloser and the first and second sectionalizers based on the location of the faulted section, and sending the control inputs directly between the recloser and the first and second sectionalizers using a data network.

BRIEF DESCRIPTION OF THE DRAWINGS

The foregoing summary, as well as the following detailed description of a presently-preferred embodiment, is better understood when read in conjunction with the appended drawings. For the purpose of illustrating the invention, the drawings show an embodiment that is presently preferred. The invention is not limited, however, to the specific instrumentalities disclosed in the drawings. In the drawings:

FIGS. 4A–4C are a tabular representation of the operation of the adaptive protection system shown in FIG. 1 in response to the present of a permanent fault occurring in a first section of a distribution feeder in which the system is installed;

FIGS. 5A–5C are a tabular representation of the operation of the adaptive protection system shown in FIG. 1 in response to the present of a permanent fault occurring in a second section of a distribution feeder in which the system is installed; and FIGS. 6A, 6B are a tabular representation of the operation of the adaptive protection system shown in FIG. 1 in response to the present of a permanent fault occurring in a third section of a distribution feeder in which the system is installed.

DESCRIPTION OF PRESENTLY-PREFERRED EMBODIMENTS

Figure 1:
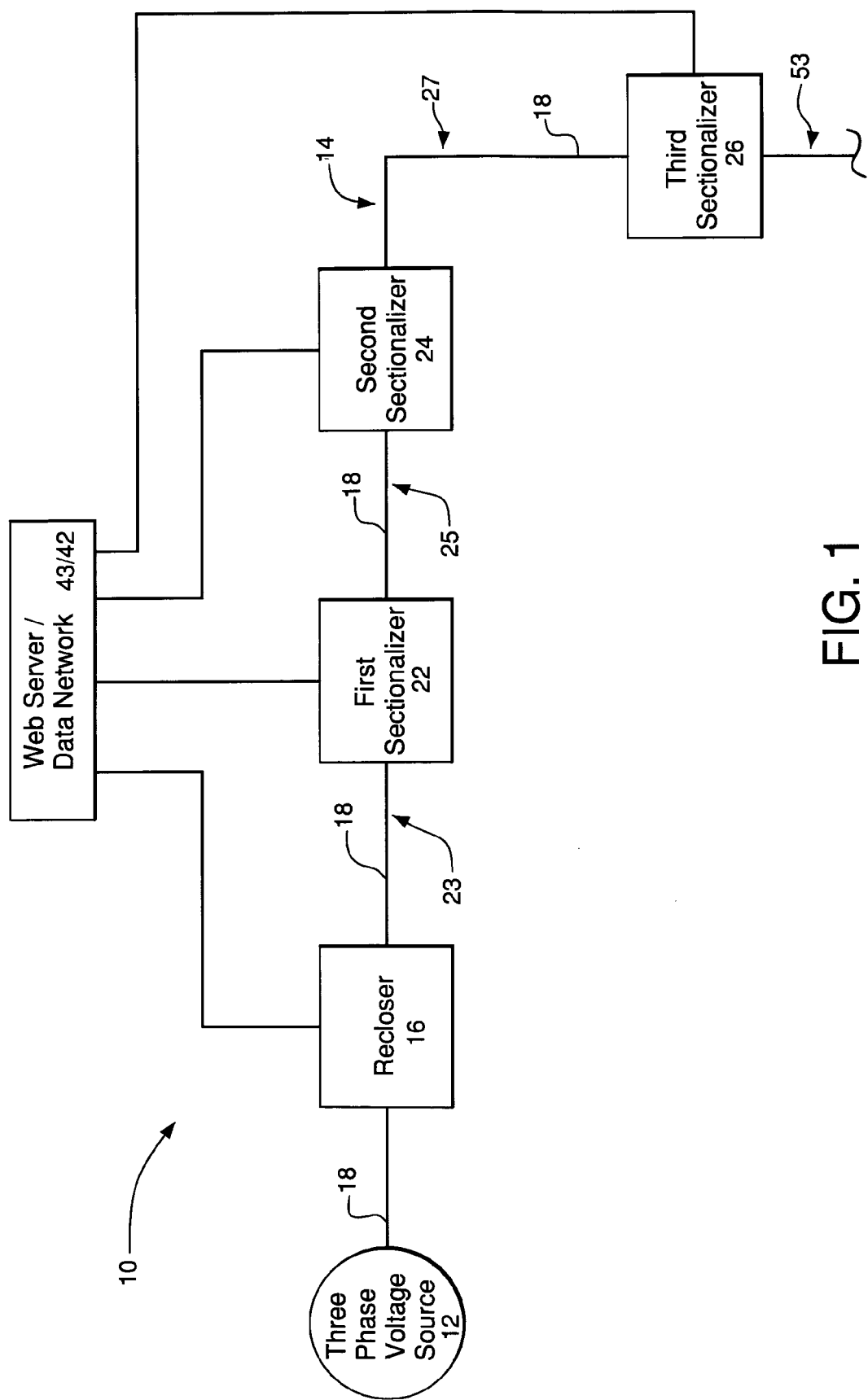
FIG. 1 is a block diagram depicting a portion of a power-distribution network equipped with a preferred embodiment of an adaptive protection system.
Figure 2:
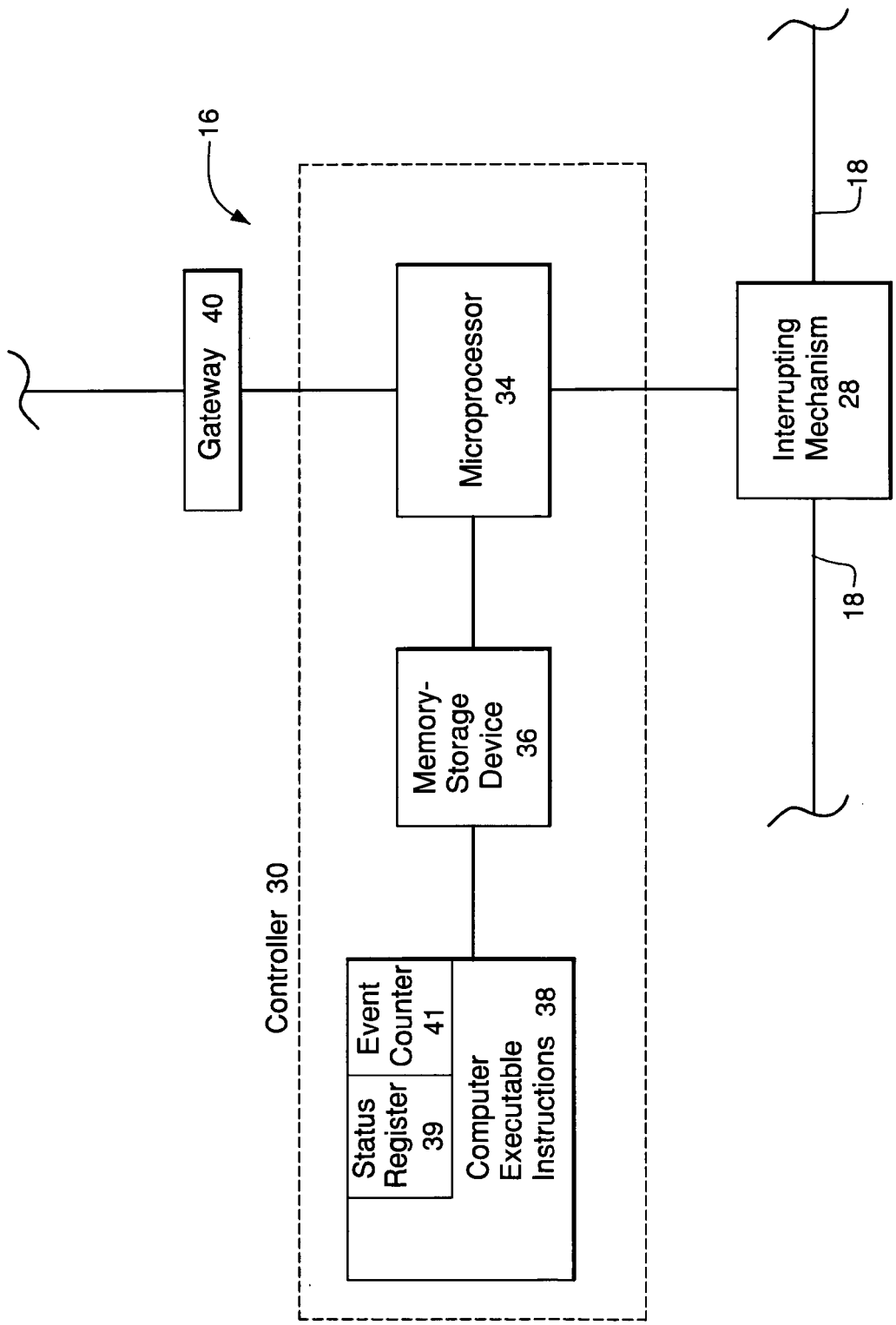
FIG. 2 is a block diagram depicting a recloser of the adaptive protection system shown in FIG. 1.
Figure 3:
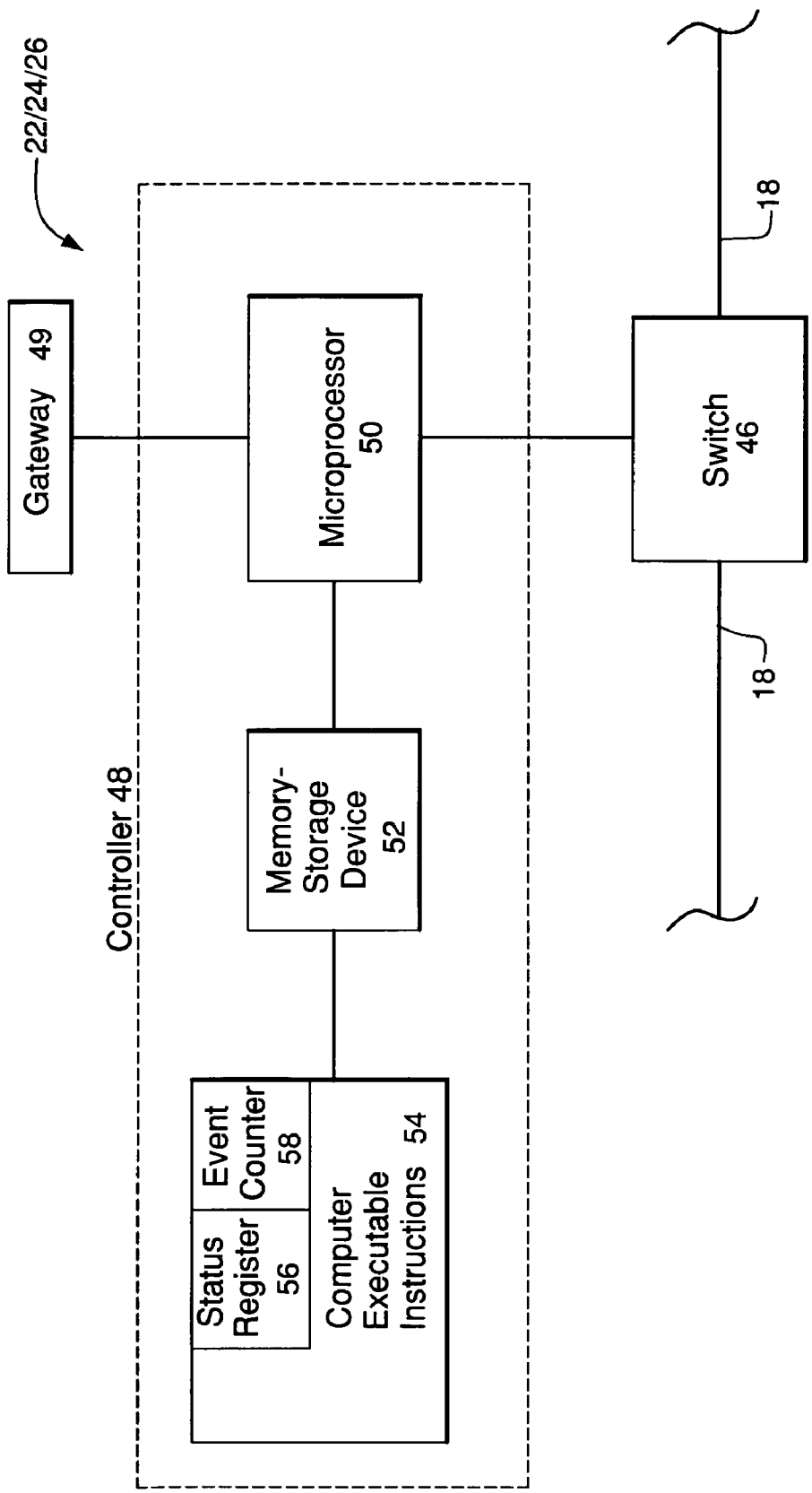
FIG. 3 is a block diagram depicting a sectionalizer of the adaptive protection system shown in FIG. 1.

FIGS. 1–3 depict a power-distribution network 10 comprising a preferred embodiment of an adaptive protection system 15. The adaptive protection system 15 is adapted to detect the presence and location of faults within an aboveground, radial distribution feeder 14 of the power-distribution network 10. Moreover, the adaptive protection system 15 is adapted to reconfigure itself to isolate the section of the distribution feeder 14 in which the fault is present, as described in detail below.

The power-distribution network 10 comprises a three-phase voltage source 12 and the distribution feeder 14 (see FIG. 1). The adaptive protection system 15 comprises a recloser 16, a first sectionalizer 22, a second sectionalizer 24, and a third sectionalizer 26.

The adaptive protection system 15 forms a part of the distribution feeder 14. More particularly, the distribution feeder 14 comprises the recloser 16, the first, second, and third sectionalizers 22, 24, 26, and a cable 18.

The cable 18 electrically couples the recloser 16 to the voltage source 12. The first, second, and third sectionalizers 22, 24, 26 are arranged in series with the recloser 16. In other words, the first sectionalizer 22 is electrically coupled to the recloser 16 by the cable 18, the second sectionalizer 24 is electrically coupled to the first sectionalizer 22 by the cable 18, and the third sectionalizer 26 is electrically coupled to the second sectionalizer 24 by the cable 18.

The sectionalizers 22, 24, 26 divide, or sectionalize, the distribution feeder 14 into a first, a second, and a third section 23, 25, 27. The first section 23 is located between the recloser 16 and the first sectionalizer 22, the second section 25 is located between the first and second sectionalizers 22, 24, and the third section 27 is located between the second and third sectionalizers 24, 26. Various electrical loads (not pictured) can be electrically coupled to and energized by each of the first, second, and third sections 23, 25, 27.

The recloser 16 comprises an interrupting mechanism 28, a controller 30 electrically coupled to the interrupting mechanism 28, and a gateway 40 electrically coupled to the controller 30 (see FIG. 2). A suitable interrupting mechanism 28 can be obtained from ABB Inc. as the type VR-3S interrupting mechanism. A suitable controller can be obtained from ABB Inc. as the PCD2000-type controller. (The use of this particular type of interrupting mechanism and controller is disclosed for exemplary purposes only, as the invention can be adapted for use with virtually any type of interrupting mechanism and controller.)

The controller 30 comprises a microprocessor 34, a memory-storage device 36 electrically coupled to the microprocessor 34, and a set of computer-executable instructions 38 stored on the memory-storage device 36. The computer-executable instructions 38 include a status register 39 and an event counter 41.

The controller 30 sends a trip ("open") command to the interrupting mechanism 28 upon sensing a fault, i.e., an overcurrent condition, in the distribution feeder 14. The controller 30 is responsive to various fault types including, for example, three-phase, phase-to-phase, two-phase to-ground, and phase-to-ground faults. Opening the interrupting mechanism 28 isolates the voltage source 12 from the portion of the distribution feeder 14 located on the load-side of the interrupting mechanism 28. The controller 30 sends a "close" command to the interrupting mechanism 28 after the interrupting mechanism 28 has been closed for a predetermined interval. The closure of the interrupting mechanism 28 in response to this command (commonly referred to as a "shot") reestablishes electrical contact between the voltage source 12 and the portion of the distribution feeder 14 located on the load-side of the interrupting mechanism 28.

The interrupting mechanism 28 remains closed after the initial reclosure (shot) if the fault in the distribution feeder 14 has cleared, i.e., if the fault is transient, rather than permanent, in nature. The controller 30 commands the interrupting mechanism 28 to open if the fault has not cleared, i.e., if the overcurrent condition reoccurs once the interrupting mechanism 28 closes. Further details relating to the operation of the recloser 16 are presented below.

The status register 39 is adapted to register the open or closed status of the interrupting mechanism 28. Moreover, the event counter 41 maintains a running count of the number of times the recloser 16 senses a fault after the initial reclosure. In other words, the controller 30 increases the count stored on the event counter 41 each time the recloser 16 is exposed to an overcurrent condition following the initial reclosure. The significance of these features is discussed below.

The gateway 40 acts as an interface between the controller 30 and a data network 42. The data network 42 preferably is the internet, or an intranet. The gateway 40 preferably communicates with the controller 30 by way of an isolated RS-232 port on each of the gateway 40 and the controller 30, and using Modbus as the communications protocol. The gateway 40 preferably communicates with a web server 43 of the data network 42 by way of an Ethernet port on the gateway 40, and using TCP/IP as the communications protocol (thereby facilitating communication with the internet or an intranet). The gateway 40 can communicate with the web server 43 using communication media such as conventional or fiber optic cable, radio transmission, etc.

The gateway 40 posts the status, i.e., the open or closed condition, of the recloser 16 to the data network 42 on a substantially continuous basis. The gateway 40 also posts the event count to the data network 42 on a substantially continuous basis. Moreover, the gateway 40 is adapted to send and receive open and close commands and other data to and from other components of the network 10, as explained in detail below.

The sectionalizer 22 comprises a switch 46, a controller 48 electrically coupled to the switch 46, and a gateway 49 electrically coupled to the controller 48 (see FIG. 3). A suitable switch 46 can be obtained from ABB Inc. as the VS-3S switch. The controller 48 is substantially similar to the controller 30. A suitable controller 48 can be obtained from ABB Inc. as the SCD2000 controller. (The use of this particular type of switch and controller is disclosed for exemplary purposes only, as the invention can be adapted for use with virtually any type of switch and controller.)

The controller 48 comprises a microprocessor 50, a memory-storage device 52 electrically coupled to the microprocessor 34, and a set of computer-executable instructions 54 stored on the memory-storage device 52. The computer-executable instructions 54 include a status register 56 and an event counter 58.

The switch 46 is adapted to open and close in response to commands from the controller 48. Opening the switch 46 isolates the voltage source 12 from the portion of the distribution feeder 14 located on the load-side of the switch 46. The switch 46 is closed during normal, i.e., fault-free, operation of the distribution feeder 14. Hence, the first and second sections 23, 25 of the distribution feeder 14 are electrically coupled during normal operation of the distribution feeder 14. The switch 46, unlike the interrupting mechanism 28 of the recloser 20, does not open directly in response to a fault in the distribution feeder 14.

The status register 56 is adapted to register the open or closed status of the switch 46. The event counter 58 maintains a running count of the number of times the sectionalizer 22 senses a fault. In other words, the controller 48 increases the count stored on the event counter 58 each time the sectionalizer 22 is exposed to an overcurrent condition. The significance of these features is discussed below.

The gateway 49 acts as an interface between the controller 48 and the data network 42. The gateway 49 preferably communicates with the controller 48 by way of an isolated RS-232 port on each of the gateway 49 and the controller 48, and using Modbus as the communications protocol. The gateway 49 preferably communicates with the data network 42 by way of an Ethernet port on the gateway 49, and using TCP/IP as the communications protocol (thereby facilitating communication with the internet or an intranet).

The gateway 49 posts the status, i.e., the open or closed condition, of the sectionalizer 22 from the status register 56 to the data network 42 on a substantially continuous basis. The gateway 49 also posts the event count from the event counter 58 to the data network 42 on a substantially continuous basis. Moreover, the gateway 49 is adapted to send and receive open and close commands and other data to and from other components of the network 10, as explained in detail below.

The sectionalizers 24, 26 are substantially identical to the sectionalizer 22 with the exception of the computer-executable instructions 54, which are tailored to each specific sectionalizer 22, 24, 26. A detailed description of the sectionalizers 24, 26 therefore is not presented herein. Moreover, the individual components of the sectionalizers 24, 26 are hereinafter referred to using reference numerals identical those used in reference to the corresponding components in the sectionalizer 22.

The switch 46 of the sectionalizer 24 is closed during normal operation of the distribution feeder 14. Hence, the second and third sections 25, 27 of the distribution feeder 14 are electrically coupled during normal operation of the distribution feeder 14. Operational details relating to the sectionalizer 24 are presented below.

The power-distribution network 10 also comprises a second radial distribution feeder 53 (shown in part in FIG. 1). The second distribution feeder 53 is substantially similar to the distribution feeder 14, and is electrically coupled to the second distribution feeder 53, as shown in FIG. 1 (the distribution feeders 14, 53 thus form a loop arrangement within the power-distribution network 10). The switch 46 of the sectionalizer 26 is open during normal operation of the distribution feeder 14. Hence, the distribution feeder 14 is normally isolated from the second distribution feeder 53 by the sectionalizer 26.

Operation the adaptive protection system 15 is described hereinafter in reference to three different types of fault scenarios, i.e., where a permanent fault is present in the first section 23 only, in the second section 25 only, and in the third section 27 only.

The adaptive protection system 15 normally operates with the interrupting mechanism 28 of the recloser 16 and the switches 46 of the sectionalizers 22, 24 in their respective "closed" positions, and the switch 46 of the sectionalizer 26 in its "open" position. Moreover, the event count of the recloser 16 is initially set at "one," and the event counts of the sectionalizers 22, 24, 26 are initially set at "zero." Hence, the first, second, and third sections 23, 25, 27 of the distribution feeder 14 are initially energized by the voltage source 12. Moreover, the first, second and third sections 23, 25, 27 are initially isolated from the second distribution feeder 53.

The occurrence of a permanent fault in the first section 23 of the distribution feeder 14 causes the following sequence of events in the network 10 (the following sequence of events is presented in tabular form in FIGS. 4A–4C).

A permanent fault in the first section 23 is initially sensed as an overcurrent condition by the controller 30 of the recloser 16. The controller 30, in response, causes the interrupting mechanism 28 of the recloser 16 to trip, or open, thereby clearing the fault temporarily and isolating the distribution feeder 14 from the voltage source 12.

The controller 30 causes the interrupting mechanism 28 to close after a predetermined interval, e.g., approximately 0.5 seconds, after the initial trip. The reoccurrence of the permanent fault upon closure of the interrupting mechanism 28 causes the controller 30 to again trip the interrupting mechanism 28, and to update the event counter 41 by one unit from its initial value of "one" (the event counter 41 therefore reads "two" at this point). Notably, the first, second, and third sectionalizers 22, 24, 26, which are located on the load-side of the fault, do not sense the fault current. Hence, the event counters 58 of each of the first, second, and third sectionalizers 22, 24, 26 are not updated, i.e., the event count stored in the event counters 58 is not increased from its initial value of zero.

The controller 30 again causes the interrupting mechanism 28 to close after a predetermined interval, e.g., approximately 15 seconds, after the initial trip. The reoccurrence of the permanent fault upon closure of the interrupting mechanism 28 causes the controller 30 to again trip the interrupting mechanism 28 and to update the event counter 41 by one unit (the event count therefore reads "three" at this point). The event counters 58 of each of the first, second, and third sectionalizers 22, 24, 26, which do not sense the fault current, are not updated.

It should be noted that the second closing, or "shot," of the recloser 16 is performed in an attempt to clear any transient faults that may occur in the distribution feeder 14. (Multiple shots must often be used to clear transient faults.) Alternative embodiments may perform only one, or more than two shots.

The gateway 40 of the recloser 16 continually posts the event count, i.e., the value stored in the event counter 41, to the data network 42, as noted previously. The gateway 40 also continually posts the status of the recloser 16, i.e., whether the interrupting mechanism 28 is open or closed, to the data network 42. Moreover, the gateway 49 of each sectionalizer 22, 24, 26 continually posts the event count and the open or closed status of the sectionalizer 22, 24, 26 to the data network 42.

Notably, the recloser 16 and the sectionalizers 22, 24, 26 each read the status and the event count of the other components of the network 10 from the data network 42. The network 10, based on this information, is adapted to reconfigure the status of the recloser 16 and the sectionalizers 22, 24, 26 to isolate the faulted section of the distribution feeder 14, as follows.

The event counter 41 of the recloser 16 reads three, and the event counters 58 of the sectionalizers 22, 24, 26 each read zero after the recloser 16 has closed and reopened for the second time with a permanent fault present in the first section 23 of the distribution feeder 14, as explained above.

The controller 48 of the second sectionalizer 24 is adapted to compare the event counts stored in the first and second sectionalizers 22, 24. The controller 48 of the second sectionalizer 24 recognizes the zero-value event count stored in the first and second sectionalizers 22, 24 as an indication that a permanent fault is not present in the second section 25 of the distribution feeder 14. Hence, no action is taken by the second sectionalizer 24 at this point.

The controller 48 of the first sectionalizer 22 compares the event counts stored in the first sectionalizer 22 and the recloser 16. The controller 48 of the first sectionalizer 22 recognizes the zero-value event count stored in the first sectionalizer 22 and the event count of three stored in the recloser 16 as an indication that a permanent fault is present in the first section 23 of the distribution feeder 14.

The adaptive protection system 15, having identified the location of the permanent fault, subsequently isolates the faulted section of the distribution feeder 14, and restores power the sections of the distribution feeder 14 where a fault is not present, as follows.

The first sectionalizer 22, which has identified the location of the permanent fault based on the event counts of the recloser 16 and the first sectionalizer 22, opens itself. In other words, the controller 48 of the first sectionalizer 22 causes the switch 46 of the first sectionalizer 22 to open. This action isolates the first section 23 of the distribution feeder 14 from the second and third sections 25, 27.

The first sectionalizer 22 also sends a "lockout" command to the recloser 16 by way of the data network 42. The lockout command prevents the controller 30 of the recloser 16 from closing the interrupting mechanism 28. This action prevents the first section 23 of the distribution feeder 14 from being reenergized by the voltage source 12.

The third sectionalizer 26 facilitates re-energization of the second and third sections 25, 27 of the distribution feeder 14, as follows.

The controller 48 of the third sectionalizer 26 reads the event count and status of the recloser 16 and the first sectionalizer 22 from the data network 42. The controller 48 of the third sectionalizer 26 sends a "change settings" command to the second sectionalizer 24 based on the event count (three) and the "locked-out" status of the recloser 16, and the event count (zero) and the "open" status of the first sectionalizer 22. The change settings command is sent to the second sectionalizer 24 by way of the data network 42. The change settings command causes the second sectionalizer 24 to reconfigure itself so that the second sectionalizer 24 is adapted to transmit current in a "reverse" direction, i.e., from the third to the second sections 25, 27 of the distribution feeder 14. In other words, the "change settings" command causes the second sectionalizer 24 to reverse its polarity.

The third sectionalizer 26, upon verifying that the polarity of the second sectionalizer 24 has been reversed, opens itself, i.e., the controller 48 of the third sectionalizer 26 causes the switch 46 of the third sectionalizer 26 to close. This action electrically couples the third section 27 of the distribution feeder 14 to the second distribution feeder 53, and thereby energizes the second and third sections 25, 27 of the distribution feeder 14 using the second distribution feeder 53.

The adaptive protection system 15 is thus capable of identifying the presence and location of a permanent fault within the distribution feeder 14. The adaptive protection system 15 can then reconfigure itself so that sections of the distribution feeder 14 that do not have a permanent fault are energized by alternate voltage source.

Moreover, as is evident from the above example, the recloser 16 and the first, second, and third sectionalizers 22, 24, 26 communicate on a "peer-to-peer" basis. In other words, the recloser 16 and the first, second, and third sectionalizers 22, 24, 26 communicate with each other, issue various control inputs to each other, and respond to those control inputs on a direct basis, without the use of a centralized communication unit. (The gateways 40, 49 of the controllers 30, 48 are thus adapted to communicate with and access data from the gateways 40, 49 of each of the other controllers 30, 48.)

The adaptive protection system 15 operates as follows when a permanent fault occurs in the second section 25 of the distribution feeder 14 (the following sequence of events is presented in tabular form in FIGS. 5A–5C).

A permanent fault in the second section 25 is initially sensed as an overcurrent condition by the controller 30 of the recloser 16. The controller 30, in response, causes the interrupting mechanism 28 of the recloser 16 to trip (open). Tripping the interrupting mechanism 28 clears the fault on a temporary basis, and isolates the distribution feeder 14 from the voltage source 12.

The controller 30 causes the interrupting mechanism 28 to undergo two shots (reclosures), in the manner described above with respect to the first fault scenario. The controller 30 updates the event counter 41, i.e., the count stored in the event counter 41 is increased by one unit from its initial value of one, in response to the fault condition that recurs after each shot. The event counter 41 of the recloser 16 thus reads "three" after the second shot of the interrupting mechanism 28, as explained above in relation to the first fault scenario.

Moreover, the first sectionalizer 22 senses the overcurrent associated with the fault because the first sectionalizer 22 is located on the source-side of the fault. Hence, the event counter 58 of the first sectionalizer 22 is increased by one unit following reach shot of the recloser 16. The event counter 58 of the first sectionalizer 22 thus reads "two." The second and third sectionalizers 24, 26 are located on the load-side of the fault. The event counters 58 of the second and third sectionalizers 24, 26 therefore remain at their initial value of "zero."

The controller 48 of the first sectionalizer 22, as noted above with respect to the first fault scenario, compares the event counts stored in the recloser 16 and the first sectionalizer 22. An event count of three is stored in the recloser 16, and an event count of two is stored in the first sectionalizer 22 at this point, as noted above. The controller 48 of the first sectionalizer 22 recognizes this combination of event counts as an indication that a fault is not present in the first section 23 of the distribution feeder 14. The first sectionalizer 22 therefore does not initiate any action at this point.

The controller 48 of the second sectionalizer 24 subsequently compares the event counts stored in the first and second sectionalizers 22, 24. An event count of two is stored in the first sectionalizer 22, and an event count of zero is stored in the second sectionalizer 24 at this point, as noted above. The controller 48 of the second sectionalizer 24 recognizes this combination of event counts as an indication that a permanent fault is present in the second section 25 of the distribution feeder 14.

The adaptive protection system 15, having identified the location of the permanent fault, subsequently isolates the faulted section and restores power the sections of the distribution feeder 14 where a fault is not present, as follows.

The second sectionalizer 24, which has identified the location of the permanent fault based on the event counts of the first and second sectionalizers 22, 24, opens itself. In other words, the controller 48 of the second sectionalizer 24 causes the switch 46 of the second sectionalizer 24 to open. This action isolates the second section 25 of the distribution feeder 14 from the third section 27.

The second sectionalizer 24 also sends an "open" command to the first sectionalizer 22 by way of the data network 42. The open command causes the switch 46 of the first sectionalizer 22 to open, thereby isolating the second section 25 of the distribution feeder 14 from the first section 23.

The second sectionalizer 24 subsequently reads the status of the first and second sectionalizers 22, 24 and the event count of the recloser 16 from the data network 42. The second sectionalizer 24 sends a "close" command to the interrupting mechanism 28 of the recloser 16 in response to the "open" status of the first and second sectionalizers 22, 24 and the event count of "three" in the recloser 16. This action reenergizes the first section 23 of the distribution feeder 14 using the voltage source 12.

The third sectionalizer 26 subsequently reads the status of the first and second sectionalizers 22, 24, and the event count and the status of the recloser 16 from the data network 42. The third sectionalizer 26 closes itself in response to the "open" status of the first and second sectionalizers 22, 24 and the recloser 16, and the event count of "three" in the recloser 16. This action electrically couples the third section 27 of the distribution feeder 14 to the second distribution feeder 53, and thereby reenergizes the third section 27 using the second distribution feeder 53.

The adaptive protection system 15 thus isolates the faulted section of the distribution feeder 14 (the second section 25), and energizes all of the sections that are not faulted (the first and third sections 22, 27). The adaptive protection system 15 accomplishes these functions entirely through the use of "peer-to-peer" communications among the recloser 16 and the first, second, and third sectionalizers 22, 24, 26, via the data network 42.

The adaptive protection system 15 operates as follows when a permanent fault occurs in the third section 27 of the distribution feeder 14 (the following sequence of events is presented in tabular form in FIGS. 6A, 6B).

A permanent fault in the third section 27 is initially sensed as an overcurrent condition by the controller 30 of the recloser 16. The controller 30, in response, causes the interrupting mechanism 28 of the recloser 16 to trip. Tripping the interrupting mechanism 28 clears the fault on a temporary basis, and isolates the distribution feeder 14 from the voltage source 12.

The controller 30 causes the interrupting mechanism 28 to undergo two shots (reclosures), in the manner described above with respect to the first and second fault scenarios. The controller 30 updates the event counter 41, i.e., the count stored in the event counter 41 is increased by one unit from its initial value of one, in response to the fault condition that recurs after each shot. The event counter 41 of the recloser 16 thus reads "three" after the second shot of the interrupting mechanism 28, as explained above in relation to the first and second fault scenarios.

Moreover, the first and second sectionalizers 22, 24 each sense the overcurrent associated with the fault because the first and second sectionalizers 22, 24 are located on the source-side of the fault. Hence, the event counts of the first and second sectionalizers 22, 24 are each increased by one unit following reach shot of the recloser 16. Each of the event counters 58 of the first and second sectionalizers 22, 24 thus read "two" (two units greater than the initial value of zero) after the second shot of the interrupting mechanism 28. The third sectionalizer 26 is located on the load-side of the fault. The event counter 58 of the third sectionalizer 26 therefore reads its initial value (zero) after the second shot of the interrupting mechanism 28.

The controller 48 of the first sectionalizer 22, as noted above with respect to the first and second fault scenarios, compares the event counts stored in the recloser 16 and the first sectionalizer 22. An event count of three is stored in the recloser 16, and an event count of two is stored in the first sectionalizer 22, as noted above. The controller 48 of the first sectionalizer 22 recognizes this combination of event counts as an indication that a fault is not present in the first section 23 of the distribution feeder 14. The first sectionalizer 22 therefore does not initiate any action at this point.

The controller 48 of the second sectionalizer 24 subsequently compares the event counts stored in the first and second sectionalizers 22, 24. An event count of two is stored in each of the first and second sectionalizers 22, 24, as previously noted. The controller 48 of the second sectionalizer 24 recognizes this combination of event counts as an indication that a permanent fault is present in the third section 27 of the distribution feeder 14. The second sectionalizer 24 responds to this condition by opening itself, i.e., the controller 48 of the second sectionalizer 24 causes the switch 46 of the second sectionalizer 24 to open. This action isolates the third section 27 of the distribution feeder 14 from the second section 25.

The recloser 16 subsequently reads the status and the event count of the first and second sectionalizers 22, 24 from the data network 42. The recloser 16 closes itself in response to the "closed" status of the first sectionalizer 22, the "open" status of the second sectionalizer 24, and the event count of "two" in the first and second sectionalizers 22, 24. In other words, the controller of the recloser 16 causes the interrupting mechanism 28 to close in response to the noted set of conditions. This action electrically couples the first section 23 of the distribution feeder 14 to the voltage source 12. The first and second sections 23, 25 of the distribution feeder 14 are thereby reenergized by the voltage source 12.

No action is taken the third sectionalizer 26 under this particular set of conditions. The third sectionalizer 26 remains "open" under this particular set of conditions, and the second distribution feeder 53 remains electrically isolated from the third section 27 of the distribution feeder 14.

The adaptive protection system 15 thus isolates the faulted section of the distribution feeder 14 (the third section 25), and energizes all of the sections that are not faulted (the first and second sections 22, 25). The adaptive protection system 15 accomplishes these functions entirely through the use of "peer-to-peer" communications among the recloser 16 and the first, second, and third sectionalizers 22, 24, 26, via the data network 42.

The adaptive protection system 15 is thus capable of identifying the presence and location of a permanent fault within any of the sections 23, 25, 27 of the distribution feeder 14. Moreover, the adaptive protection system 15 can isolate the faulted section, and can restore power to all of the un-faulted sections regardless of the location of the faulted section. In other words, the adaptive protection system 15 de-energizes only the faulted section of the distribution feeder 14.

The recloser 16 and the first, second, and third sectionalizers 22, 24, 26 of the adaptive protection system 15 accomplish the above-noted functions by communicating directly with each other, and using control logic incorporated into each of the recloser 16 and the first, second, and third sectionalizers 22, 24, 26. Moreover, the noted use of the TCP/IP communications protocol facilitates the use of the extensive and readily-available capabilities the internet (or a private intranet).

Applicants have thus exploited the programmability of microprocessor-based controllers and the capabilities of internet or intranet-based communication systems in a manner that permits the individual components of the adaptive protection system 15 to directly control the adaptive protection system 15, and to exchange information over a readily-available communication network. The adaptive protection system 15 thus eliminates the need for a centralized communication unit, and the accompanying cost, complexity, communication lines, etc. that accompany the use of a centralized communication unit.

Moreover, the use of an internet or intranet-based communication system facilitates communication with a central location, e.g., a monitoring station operated by the utility company. This feature permits the utility company to readily track the status, maintenance requirements, operating history, load conditions, etc. of the power distribution network 10.

Moreover, the adaptive protection system 15 is capable of clearing transient faults occurring in the distribution feeder 14. In particular, the adaptive protection system 15, as noted above, can be programmed so that the recloser 16 undergoes multiple shots before the adaptive protection system 15 initiates any action to isolate a faulted section of the distribution feeder 14. Transient faults, as noted above, can often be cleared by cycling the recloser 16 though multiple shots. Prolonged power outages and unnecessary service calls can thus be avoided through the use of this feature.

Furthermore, the adaptive protection system 15 can be implemented using conventional, readily-available microprocessor-based controllers and conventional gateways, and adds minimally to the overall number of components and the complexity of the power-distribution network 10. Also, the adaptive protection system 15 can identify and isolate a faulted section of the distribution feeder 14 using only one shot of the recloser 16. Hence, the adaptive protection system 15 can restore power to un-faulted sections of the distribution feeder 14 more quickly than conventional protections systems that require multiple shots to identify and isolate a faulted section.

It is to be understood that even though numerous characteristics and advantages of the present invention have been set forth in the foregoing description, the disclosure is illustrative only and changes can be made in detail within the principles of the invention to the full extent indicated by the broad general meaning of the terms in which the appended claims are expressed.

For example, alternative embodiments can comprise more than one of the reclosers 16, and more or less than the three sectionalizers 22, 24, 26 of the adaptive protection system 15. Moreover, although the adaptive protection system 15 has been described in conjunction with an above-ground, radial distribution feeder 14, the invention can be used in conjunction with underground distribution feeders, as well as loop-type distribution feeders. Furthermore, although the invention has been described in conjunction with an adaptive protection system 15 that detects and isolates faulted sections of the distribution feeder 14, alternative embodiments may be adapted to perform fault detection only, power-quality checks, remote monitoring, load control, etc.

Alternative embodiments may also include alternative (backup) provisions to isolate faulted sections of the power-distribution network 10 in the event the adaptive protection system 15 becomes partially or fully inoperative. For example, the sectionalizers 22, 24 can be programmed to open on a sequential basis after the recloser 16 has cycled through a predetermined number of closings and openings, as described above in relation to a conventional protection system.

What is claimed is:

1. An adaptive protection system for a power-distribution network, comprising:

a recloser electrically coupled to a first voltage source and a first section of a distribution feeder and adapted to isolate the first section from the first voltage source in response to an overcurrent condition in the distribution feeder;

a first sectionalizer electrically coupled to the first section and a second section of the distribution feeder, the first sectionalizer being adapted to isolate the first section from the second section on a selective basis; and a second sectionalizer electrically coupled to the second section and a third section of the distribution feeder and adapted to isolate the second section from the third section on a selective basis, wherein the recloser and the first and second sectionalizers are adapted to communicate by way of a data network separate from the distribution feeder, and at least one of the first and second sectionalizers:

identifies a faulted section of the distribution feeder;

determines a configuration of the first and second sectionalizers and the recloser to isolate the faulted section of the distribution feeder from a remainder of the distribution feeder; and generates and sends commands to the other of the first and second sectionalizers and/or the recloser to configure the other of the first and second sectionalizers and/or the recloser to isolate the faulted section of the distribution feeder.

2. The system of claim 1, wherein the recloser and the first and second sectionalizers are adapted to communicate by way of the data network data using a TCP/IP communications protocol.

3. The system of claim 1, further comprising a third sectionalizer electrically coupled to a second voltage source and located between the third section and the second voltage source, wherein the third sectionalizer is adapted to isolate the third section from the second voltage source on a selective basis, the third sectionalizer is adapted to communicate with the recloser and the first and second sectionalizers by way of the data network, and at least one of the first and second sectionalizers is responsive to control inputs received by the at least one of the first and second sectionalizers from the third sectionalizer.

4. The system of claim 3, wherein the first and second sectionalizers are each adapted to sense the overcurrent condition, and to identify an approximate location of a fault causing the overcurrent condition by comparing at least one of (i) the number of times the recloser has responded to the overcurrent condition with a number of times at least one of the first and second sectionalizers has sensed the overcurrent condition, and (ii) the number of times the first and second sectionalizers have each sensed the overcurrent condition.

5. The system of claim 4, wherein:

the first sectionalizer is adapted to (i) open and thereby isolate the first section from the second section, and (ii) generate and send a control input to the recloser that causes the recloser to remain in an open position thereby isolating the first section from the first voltage source when the fault is located in the first section; and the third sectionalizer is adapted to (i) close and thereby electrically couple the third section and the second voltage source, and (ii) generate and send a control input to the second sectionalizer that causes the second sectionalizer reverse polarity when the fault is located in the first section.

6. The system of claim 4, wherein:

the second sectionalizer is adapted to (i) open and thereby isolate the third section from the second section, and (ii) generate and send a control input to the first sectionalizer that causes the first sectionalizer to open and thereby isolate the second section from the first section when the fault is located in the second section;

the recloser is adapted to close and thereby electrically couple the first section and the first voltage source when the fault is located in the second section; and the third sectionalizer is adapted to close and thereby electrically couple the third section the second voltage source when the fault is located in the second section.

7. The system of claim 4, wherein:
the recloser is adapted to close and thereby electrically couple the first section and the first voltage source when the fault is located in the third section; and the second sectionalizer is adapted to open and thereby electrically isolate the third section from the second section when the fault is located in the third section.

8. The system of claim 2, wherein the data network is the internet.

9. The system of claim 2, wherein the data network is an intranet.

10. The system of claim 3, wherein:
the recloser comprises an interrupting mechanism movable between an open and a closed position, a controller electrically coupled to the interrupting mechanism, and a gateway electrically coupled to the controller and adapted to communicate with the data network; and the first, second, and third sectionalizers each comprise a switch movable between an open and a closed position, a controller electrically coupled to the switch, and a gateway electrically coupled to the controller and adapted to communicate with the data network.

11. The system of claim 10, wherein the controllers each comprise a microprocessor, a memory-storage device electrically coupled to the microprocessor, and a set of computer-executable instructions stored on the memory-storage device.

12. The system of claim 11, wherein the computer-executable instructions each include an event counter adapted to maintain a count of the number of the times the recloser and the first, second, and third sectionalizers, respectively, have been exposed to the overcurrent condition.

13. The system of claim 1, wherein:
each of the first and second sectionalizers comprises a switch responsive to the control input from the other of the first and second sectionalizers and movable between an open position wherein the switch interrupts a flow of electrical current through the respective first and second sectionalizers, and a closed position wherein the switch does not interrupt the flow of electrical current through the respective first and second sectionalizers; and the recloser comprises an interrupting mechanism responsive to the overcurrent condition and movable between an open position wherein the interrupting mechanism interrupts a flow of electrical current though the recloser, and a closed position wherein the interrupting mechanism does not interrupt the flow of electrical current though the recloser, the interrupting mechanism being adapted to be locked in the open position in response to the control input from the at least one of the first and second sectionalizers.

14. The system of claim 13, wherein the recloser and the first and second sectionalizers are each adapted to post to and read from the data network (i) a status reading indicating an open or closed status of the respective recloser and the first and second sectionalizers, and (ii) an event count indicating the number of times the respective recloser and the first and second sectionalizers have been exposed to the overcurrent condition.

15. The system of claim 13, wherein the recloser is adapted to move the interrupting mechanism to the closed position following a predetermined interval after the interrupting mechanism has moved to the open position in response to the overcurrent condition.

16. A system, comprising:
a recloser electrically coupled to a first voltage source and comprising a microprocessor-based controller and a gateway equipped with a TCP/IP communications protocol;

a first sectionalizer electrically coupled to the recloser so that the recloser is adapted to isolate the first sectionalizer from the first voltage source on a selective basis, the first sectionalizer comprising a microprocessor-based controller and a gateway equipped with the TCP/IP communications protocol;

a second sectionalizer electrically coupled to the first sectionalizer so that the first sectionalizer is adapted to isolate the second sectionalizer from the first voltage source on a selective basis, the second sectionalizer comprising a microprocessor-based controller and a gateway equipped with the TCP/IP communications protocol, and a third sectionalizer electrically coupled to the second sectionalizer so that the third sectionalizer is adapted to isolate the second sectionalizer from a second voltage source on a selective basis, the third sectionalizer comprising a microprocessor-based controller and a gateway equipped with the TCP/IP communications protocol, wherein the controller and the gateway of at least one of the first, second, and third sectionalizers:

senses an overcurrent condition caused by a fault in a section of a distribution feeder;

identifies the section of the distribution feeder having the fault;

determines a configuration of the first, second, and third sectionalizers and the recloser to isolate the faulted section of the distribution feeder from a remainder of the distribution feeder; and generates and sends commands to another of the first, second, and third sectionalizers and/or the recloser by way of a data network to configure the another of the first, second and third sectionalizers and/or the recloser to isolate the faulted section of the distribution feeder.

17. The system of claim 16, wherein each of the first, second, and third sectionalizers comprises a switch electrically coupled to the controller of the respective first, second, and third sectionalizers, the switches being responsive to one or more of the control inputs and being movable between an open position wherein the switch interrupts a flow of electrical current though the respective first, second, and third sectionalizers, and a closed position wherein the switch does not interrupt the flow of electrical current though the respective first, second, and third sectionalizers.

18. The system of claim 17, wherein the recloser comprises an interrupting mechanism electrically coupled to the controller of the recloser, the interrupting mechanism being responsive to the overcurrent condition and being movable between an open position wherein the interrupting mechanism interrupts a flow of electrical current though the recloser, and a closed position wherein the interrupting mechanism does not interrupt the flow of electrical current though the recloser, the interrupting mechanism being adapted to be locked in the open position in response to one or more of the control inputs.

19. The system of claim 18, wherein the recloser and the first, second, and third sectionalizers are each adapted to post to and read from the data network (i) a status reading indicating an open or closed status of the respective recloser and the first, second and third sectionalizers, and (ii) event count indicating the number of times the respective recloser and the first, second, and third sectionalizers have been exposed to the overcurrent condition.

20. The system of claim 16, wherein the data network is the internet.

21. The system of claim 16, wherein the data network is an intranet.

22. A power-distribution network, comprising a first voltage source and a distribution feeder, the distribution feeder comprising:
an electrically-conductive cable;
a recloser electrically coupled to the first voltage source and a first section of the cable and adapted to isolate the first section from the first voltage source in response to an overcurrent condition in the distribution feeder;
a first sectionalizer electrically coupled to the first section and a second section of the cable, the first sectionalizer being adapted to isolate the first section from the second section on a selective basis; and
a second sectionalizer electrically coupled to the second section and a third section of the cable and adapted to isolate the second section from the third section on a selective basis, wherein the recloser and the first and second sectionalizers are adapted to communicate by way of a data network, the recloser is responsive to control inputs received by the recloser from at least one of the first and second sectionalizers, and at least one of the first and second sectionalizers is responsive to control inputs received by the at least one of the first and second sectionalizers from the other of the first and second sectionalizers; wherein at least one of the first and second sectionalizers:
identifies a faulted section of the distribution feeder;
determines a configuration of the first and second sectionalizers and the recloser to isolate the faulted section of the distribution feeder from a remainder of the distribution feeder; and
generates and sends commands to the other of the first and second sectionalizers and/or the recloser by way of the data network to configure the other of the first and second sectionalizers and/or the recloser to isolate the faulted section of the distribution feeder.

23. The network of claim 22, further comprising a second voltage source, wherein the distribution feeder further comprises a third sectionalizer electrically coupled to the second voltage source and located between the third section and the second voltage source, wherein the third sectionalizer is adapted to isolate the third section from the second voltage source on a selective basis, the third sectionalizer is adapted to communicate with the recloser and the first and second sectionalizers by way of the data network, and at least one of the first and second sectionalizers is responsive to control inputs from the third sectionalizer.

24. The network of claim 22 wherein the first and second sectionalizers are adapted to communicate by way of the data network using a TCP/IP protocol.

25. The network of claim 24, wherein the data network is the internet.

26. The network of claim 24, wherein the data network is an intranet.

27. A system comprising:
a recloser electrically coupled to a first voltage source and a first section of a distribution feeder, the recloser comprising a controller and an interrupting mechanism adapted to move between an open and a closed position in response to a control input from the controller;
a first sectionalizer electrically coupled to the first section and a second section of the distribution feeder, the first sectionalizer comprising a controller and a switch adapted to move between an open and a closed position in response a control input from the controller;
a second sectionalizer electrically coupled to the second section and a third section of the distribution feeder, the second sectionalizer comprising a controller and a switch adapted to move between an open and a closed position in response to a control input from the controller; and
a peer-to-peer communication system comprising a plurality of gateways each electrically coupled to a respective one of the controllers and each being equipped with a common communications protocol so that the gateways are adapted to exchange information over a data network; wherein at least one of the first and second sectionalizers:
identifies a faulted section of the distribution feeder;
determines a configuration of the first and second sectionalizers and the recloser to isolate the faulted section of the distribution feeder from a remainder of the distribution feeder; and
generates and sends commands to the other of the first and second sectionalizers and/or the recloser by way of the data network to configure the other of the first and second sectionalizers and/or the recloser to isolate the faulted section of the distribution feeder.

28. The system of claim 27, wherein the gateways exchange the control inputs over the data network.

29. The system of claim 27, wherein the gateways exchange status information relating to the recloser and the first and second sectionalizers over the data network.

30. The system of claim 27, wherein the communications protocol is a TCP/IP communications protocol.

31. The system of claim 30, wherein the data network is the internet.

32. The system of claim 30, wherein the data network is an intranet.

33. A method for isolating a faulted section of a distribution feeder of a power-distribution network, comprising:
using at least one of a first and a second sectionalizer of the distribution feeder to identify the location of the faulted section by comparing at least one of (i) the number of times a recloser of the distribution feeder has responded to an overcurrent condition with a number of times at least one of the first and second sectionalizers of the distribution feeder have sensed the overcurrent condition, and (ii) the number of times the first and second sectionalizers have each sensed the overcurrent condition;
using at least one of the first and the second sectionalizers to determine a configuration of the first and second sectionalizers and the recloser to isolate the faulted section of the distribution feeder from a remainder of the distribution feeder; and
using at least one of the first and the second sectionalizers to generate and send commands to the other of the first and the second sectionalizers and/or the recloser by way of a data network to configure the other of the first and the second sectionalizers and/or the recloser to isolate the faulted section of the distribution feeder.

34. The method of claim 33, further comprising:
opening the first sectionalizer to isolate the faulted section from a second section of the distribution feeder;
generating and sending one of the commands to the recloser using the first sectionalizer to cause the recloser to remain in an open position and thereby isolate the faulted section from the voltage source;
closing the third sectionalizer to electrically couple a third section of the distribution feeder with a second voltage source; and
generating and sending another of the control inputs to the second sectionalizer using the third sectionalizer to cause the second sectionalizer to reverse polarity.

35. The method of claim 33, further comprising:
opening the second sectionalizer to isolate the faulted section from a third section of the distribution feeder;
generating and sending one of the commands to the first sectionalizer using the second sectionalizer to cause the first sectionalizer to open and thereby isolate the faulted section from a first section of the distribution feeder;
closing the recloser to electrically couple the first section and the first voltage source; and
closing the third sectionalizer to electrically couple the third section and a second voltage source.

36. The method of claim 33, further comprising:
closing the recloser to electrically couple a first section of the distribution feeder and a first voltage source; and
opening the second sectionalizer to electrically isolate the faulted section from a second section of the distribution feeder.

37. The method of claim 33, wherein the first and the second sectionalizers generate and send the commands to the other of the first and the second sectionalizers and/or the recloser by way of the internet.

38. The method of claim 33, wherein the first and the second sectionalizers generate and send the commands to the other of the first and the second sectionalizers and/or the recloser by way of an intranet.

39. The system of claim 3, wherein at least one of the first, second, and third sectionalizers:
identifies the faulted section of the distribution feeder;
determines a configuration of the first, second, and third sectionalizers and the recloser to isolate the faulted section of the distribution feeder from the remainder of the distribution feeder; and
generates and sends commands to the others of the first, second, and third sectionalizers and/or the recloser by way of the data network to configure the others of the first, second and third sectionalizers and/or the recloser to isolate the faulted section of the distribution feeder.

* * * * *